United States Patent [19]

Campbell et al.

[11] 4,125,651
[45] Nov. 14, 1978

[54] METHOD FOR MAKING CHEMICALLY DURABLE SILICATE COATINGS

[75] Inventors: Larry E. Campbell, Corning; Stanley D. Stookey, Painted Post, both of N.Y.

[73] Assignee: Corning Glass Works, Corning, N.Y.

[21] Appl. No.: 718,773

[22] Filed: Aug. 30, 1976

Related U.S. Application Data

[63] Continuation of Ser. No. 435,703, Jan. 23, 1974, abandoned.

[51] Int. Cl.² .......................................... D02G 3/00
[52] U.S. Cl. ............................ 427/372 B; 106/74; 428/450
[58] Field of Search .................. 427/372 B; 428/450, 428/469; 106/74

[56] References Cited

U.S. PATENT DOCUMENTS

| | | | |
|---|---|---|---|
| 1,770,811 | 7/1930 | Schwartz et al. | 428/450 |
| 2,807,552 | 9/1957 | Robinson et al. | 106/74 |
| 2,978,361 | 4/1961 | Seidl | 106/74 |
| 3,070,460 | 12/1962 | Huppke | 428/450 |
| 3,326,715 | 6/1967 | Twells | 427/372 |
| 3,498,802 | 3/1970 | Bickford et al. | 106/74 |
| 3,499,780 | 3/1970 | Etherington et al. | 148/6.27 |
| 3,505,051 | 4/1970 | Buckley et al. | 427/372 |
| 3,678,144 | 7/1972 | Shoup | 264/63 |
| 3,811,853 | 5/1974 | Bartholomew et al. | 106/74 |
| 3,827,893 | 8/1974 | Meissner et al. | 106/74 |

*Primary Examiner*—Ronald H. Smith
*Assistant Examiner*—Sadie L. Childs
*Attorney, Agent, or Firm*—Clinton S. Janes, Jr.; Clarence R. Patty, Jr.

[57] ABSTRACT

This invention relates to the production of chemically durable inorganic silicate coatings which are homogeneous, easy to apply, and exhibit essentially infinite shelf life. More specifically, this invention relates to the preparation of such coatings by incorporating a metal oxide ($M_xO_y$) wherein Y:X is at least 1.5, into a true aqueous solution of an alkali metal silicate, at least about 50% by weight of said alkali metal consisting of potassium, which will dry in air, i.e., be non-hygroscopic. Thereafter, upon drying and curing, a crystal phase precipitates in situ within the solution causing polymerization of the silica at the crystal interfaces and subsequently throughout the solution, thus yielding a durable coating consisting essentially of a crystal phase homogeneously dispersed in a silicate glassy matrix.

6 Claims, 2 Drawing Figures

METHOD FOR MAKING CHEMICALLY DURABLE SILICATE COATINGS

This is a continuation of application Ser. No. 435,703, filed Jan. 23, 1974, and now abandoned.

BACKGROUND OF THE INVENTION

Various organic-base paints for painting metals are well known to the art and their deficiencies as protective coatings for metals are likewise well-recognized. Numerous inorganic-base protective coatings have been devised, each of which relies upon a somewhat different mechanism for efficiency and protection. Of the various inorganic-base coatings developed, those utilizing the alkali metal silicates are probably the most useful. In general, these alkali metal silicate coatings have contained reactive solid powdered ingredients such as zinc powder, aluminium powder, ZnO, $Al_2O_3$, or $TiO_2$. The metallic particles behave as sacrificial anodes with the alkali metal silicate comprising a binder or matrix therefor. In both types of coatings, the mixture must be undertaken essentially immediately before the coating is to be applied since the shelf life thereof is short. Moreover, the mixing process can be hazardous to health, especially in the case of zinc dust. Still another approach has been to prepare colloidal solutions of sodium silicate, exchange lithium for the sodium to produce a lithium silicate colloidal solution, and then add zinc powder as a sacrificial anode to the colloidal solution. These coatings have been termed lithium polysilicate paints. However, these paints are fairly expensive to produce and require fillers to provide the desired opacity or density in the coating.

U.S. Pat. No. 3,678,144 teaches a process for producing porous and non-porous glass articles having a substantial range of oxide compositions by dissolving metal oxides characterized by $M_xO_y$ in a true or colloidal aqueous solution of soluble silicates and certain organic compounds or inorganic salts, this solution having a pH greater than 10, and thereafter heating the solution to polymerize the silica, coprecipitate the added metal oxide therewith, and form a solid body.

SUMMARY OF THE INVENTION

We have discovered that alkali metal silicate protective coatings composed of crystals homogeneously dispersed in a silicate glassy matrix can be produced in accordance with the following three steps. First, a true aqueous solution is prepared containing one or more water-soluble alkali metal silicates, but with at least about one-half of the alkali metal being present as potassium, and a metal oxide characterized as $M_xO_y$ wherein the ratio Y:X is at least 1.5. The solution must exhibit a pH sufficiently high to dissolve the silica species, normally about 9-15, and be capable of drying in air, i.e., not be hygroscopic. Second, the solution is applied to a substrate to be protected and the thus-formed coating dried at either room temperature or with gentle heating. Third, the dried coating is cured by heating to temperatures between about 40°-150° C. to cause the precipitation in situ of crystal phases within the coating. This crystalline product acts to polymerize the silica in the coating at the crystal interfaces and subsequently throughout the coating.

We have discovered that more durable paints can be produced if very small amounts of heavy metal salts are added. The additions of these small amounts of heavy metal ions cause a more uniform curing and precipitation of silica as can be witnessed by microscopic examination. Heavy metal ions such as copper and nickel have been found to promote uniform curing. Without the additions of these agents, the durability of the coating is much poorer.

DESCRIPTION OF THE PREFERRED EMBODIMENT

Figure 1:
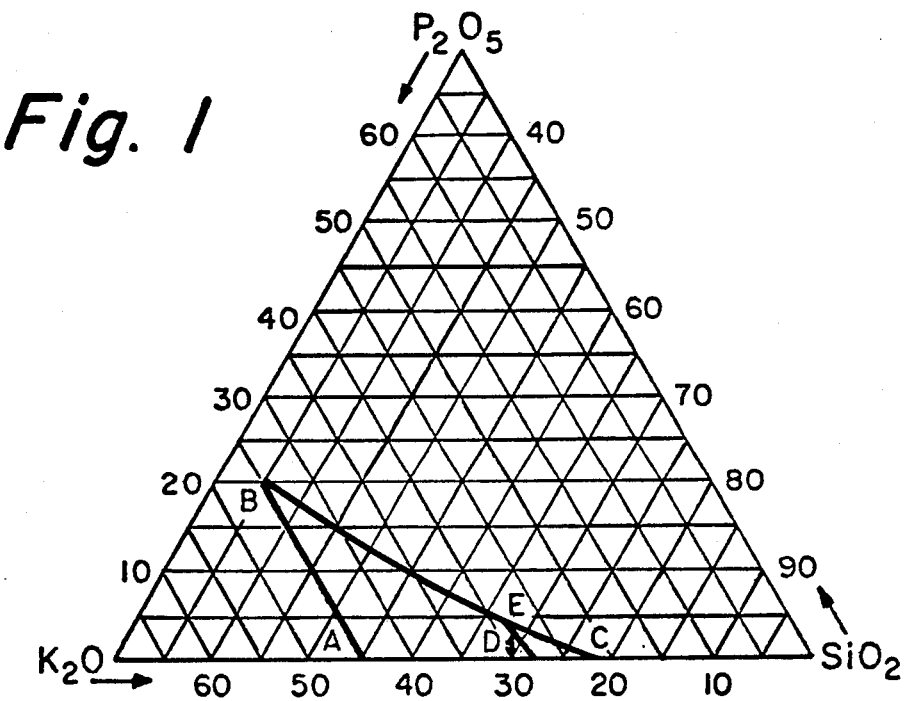

The coatings of the invention are composed of three principal components: a water-soluble silicate, a metal oxide additive $M_xO_y$, and water. Various water-soluble silicates are known in the art and, for this invention, such silicate solutions should contain 1-12 moles of $SiO_2$ per liter. For obvious reasons of economy, we prefer to employ commercially-available solutions. Sodium silicate and potassium silicate are available as true solutions. It is apparent that these solutions can be mixed together in various proportions to obtain desired concentrations of silica in the solution but it is desirable to have at least about half the alkali to be present as potassium. Table I reports the compositions, in weight percent, of the commercially-available silicate solutions which were utilized in the working examples of this invention.

TABLE I

| | | |
|---|---|---|
| Potassium Silicate | 8.3% $K_2O$, | 20.8% $SiO_2$, balance water |
| Sodium Silicate | 6.8% $Na_2O$, | 25.3% $SiO_2$, balance water |

Each of these solutions has a pH sufficiently high such that the silica will remain in solution. Also, these solutions can be air dried, i.e., they are non-hygroscopic.

The metal oxide additive, $M_xO_y$, can be deemed as constituting an intermediate in the glassy film. As was observed above, the most uniform crystallization is secured where the crystals are precipitated in situ during drying from a true solution. In order to provide a true solution, the $M_xO_y$ must be essentially completely hydrolyzed therein. When Y:X is 1 (the oxidation state of M is +2), $M_xO_y$ is not extensively hydrolyzed and will tend to form an undesirable insoluble hydroxide hydrate. However, when Y:X is at least 1.5, $M_xO_y$ can be substantially hydrolyzed and, therefore, can be used successfully. Ratios of Y:X as high as 3.5 can be employed, in which case the oxidation state of the metal ion is +7. Table II below records several metal oxides capable of producing a salt, exhibiting a Y:X ratio of at least 1.5, which will polymerize the $SiO_2$.

TABLE II

| Y:X Ratio | Metal Oxides |
|---|---|
| 1.5 | $Cr_2O_3$ |
| 2.0 | $GeO_2$ |
| 2.5 | $P_2O_5$, $As_2O_5$ |
| 3.0 | $WO_3$, $CrO_3$ |
| 3.5 | $Mn_2O_7$ |

Water is the third ingredient of the coatings of this invention but which acts merely as a vehicle wherein the other components can be dissolved. Hence, dilute or concentrated solutions can be prepared so long as the metal oxide additive, $M_xO_y$, is essentially completely dissolved therein. It will be apparent that very dilute solutions will present real problems with regard to applying an adequate amount to a substrate to achieve a coating of practical thickness. For this reason, a solution containing at least about 10% by weight solids is to be preferred.

The operability of the solutions as protective coatings is dependent upon the pH necessary to achieve solution thereof and the requirement that they be non-hygroscopic. Thus, whereas the solutions may contain one or more of the above-recited soluble silicates and one or more of the $M_xO_y$ species, they must have a pH sufficiently high and must be capable of air drying. At low pH values, the solutions will tend to gel and, hence, not react in the necessary manner. In general, the pH of the solution should range between about 9 and 15. Non-hygroscopic behavior is mandatory such that water can be removed from the solution; the water remaining in the final product undesirably affects silica polymerization and the durability of the coating produced.

Various reagents may be employed in preparing the solutions. Thus, the components are not necessarily added as the oxides. Hence, as was observed above, the alkali metal oxides and silica are generally present as a soluble silicate solution. Likewise, the $M_xO_y$ can be added as water soluble compounds. For example, $Na_3PO_4$ can be dissolved in the solution to yield the phosphate species which is hydrolyzed $P_2O_5$.

The bulk chemical composition of the coatings after evaporation of the water can be described in triaxial diagrams defining the solution composition. This situation results from the fact that water is the sole constituent removed from the coating and, therefore, the other ingredients remain in the coating in substantially the same relationship one to another. These diagrams are meant to indicate composition but not structure.

The solutions are applied to a substrate in any of the conventional methods, e.g., painting, spraying, or dipping, and are normally allowed to dry in the ambient atmosphere. As the water evaporates from the coating, at least one phase may become saturated and thereafter precipitate upon further drying. If this precipitation does not take place during drying, the coating may be heated slightly to cause the saturation and precipitation of the crystal phase. The final coating is actually a polymerized silica network with at least one crystal phase dispersed therein. These crystals are water soluble but, with sufficient polymerization of the silica, they may be enveloped therein. Commonly, the crystal phase will contain some of the alkali metal along with the ion form of the $M_xO_y$; therefore, removing some of these water-soluble components from the polymerized silica will leave a matrix which is less soluble in water.

Curing must be undertaken at a temperature below which there is rapid evaporation of water from the coating. That is, at least the initial curing must be undertaken at such temperatures or rapid vaporization of water will cause the coating to foam. Of course, after the bulk of the water has been removed, higher temperatures can be utilized to expedite final curing.

As was observed above, the highest degree of polymerization is secured where the crystal phase is uniformly very fine-grained and homogeneously dispersed in the coating. Thus, the heavy metal ions can be advantageously added to obtain this desired crystal distribution. $Cu^{+2}$, $Zn^{+2}$, $Ni^{+2}$ and $Co^{+2}$ are heavy metal ions frequently added to the solution as nitrates. The heavy metal oxide is advantageously present in amounts between about 0.1–1% by weight of total solids, with about 0.4–0.6% by weight being preferred. Above about 1% by weight of the heavy metal oxides, the ions form gels and tend to precipitate and separate out of solution. Inasmuch as the crystallization resulting from the addition of the heavy metal agents is more uniformly fine-grained and more homogeneously dispersed in the silica matrix, the chemical durability of the final coatings is better than the products crystallized without the presence of these agents. However, in all cases, the coatings adhere to the substrate.

As illustrative of the invention only with no design to be limiting thereof, the following discussion of several specific coating composition systems is presented. Since the systems behave similarly to each other, an extensive description of the $K_2O$—$P_2O_5$—$SiO_2$ products will suffice to demonstrate the mechanics and procedure of the inventions.

Solutions of potassium silicate ($K_2O$—$SiO_2$) otherwise known as water glasses, are well-known in the art and can contain $SiO_2$ and $K_2O$ in mole ratios up to about 4:1 with the total of $K_2O$ and $SiO_2$ comprising approximately 28% by weight of the solution. Such a product is listed in Table I. That commercially-marketed solution was employed in the following procedures. Phosphorous pentoxide ($P_2O_5$) was added to the solutions in varying proportions but the amounts of $K_2O$, $SiO_2$, and $P_2O_5$ were so controlled as to give a solids concentration of about 30% by weight of the solutions. The Y:X ratio in $P_2O_5$ is 2.5 with the phosphorous iron exhibiting an oxidation state of +5. Thus, $P_2O_5$ will be extensively hydrolyzed in aqueous solutions. The dilution of the solution is a function of the solubility of the particular constituents and the spreadability of the final product. Hence, solutions containing more than about 30% by weight solids can be employed if the various species are present in the proper relation to each other.

In general, the amounts of concentrations of the individual species in solution will be defined by the solubility of the silicate species and the composition whereat the solution will dry in the ambient atmosphere. FIG. 1 sets forth the $K_2O$—$P_2O_5$—$SiO_2$ composition range (ABC) in weight percent wherein true solutions can be prepared. Compositions to the right or above the line BC do not form desirable solutions in that partial gelation occurs therein. Compositions to the left of line AB exhibit hygroscopic behavior and, hence, will not dry in the ambient atmosphere. Thus, the field circumscribed by ABC represents those compositions of $K_2O$—$P_2O_5$—$SiO_2$ forming a solution and which will dry in air. The line AB approximates a 45% by weight $K_2O$ composition. However, that value of $K_2O$ is unique only to that particular composition system.

The aqueous $K_2O$—$P_2O_5$—$SiO_2$ solutions were applied to flat strips of steel by painting, dipping, and spraying with the viscosity and other application parameters being adjusted for good spreadability of the coating, but always maintaining a true solution, and the coating then allowed to dry in air.

The coatings are cured by heating the coated strips to a temperature above which a phosphorous-containing crystal will precipitate but below which the coating will foam. The minimum treatment temperature to insure effective curing within a reasonably short period of time is about 40° C. Foaming can take place at temperatures above 100° C. when the coating is first applied, unless undertaken in the atmosphere under pressure. Therefore, temperatures less than about 100° C. are commonly employed, at least during the initial stages of the curring treatment. After much of the water has been vaporized, higher temperatures can be utilized to expedite the curing and obtain a hard, dense coating. Curing temperatures higher than 200° C. can be employed successfully but with no mechanical advantage so that has seemed to constitute a practical maximum. The coatings are cured for a period of time sufficient to completely react the film, normally about ½–8 hours depending upon the composition of the film and the curing temperature employed, giving an opaque coating which is generally white.

During the curing process, the crystal potassium dihydrogen phosphate ($KH_2PO_4$) is produced with a minor amount of potassium monohydrogen silicate ($KHSi_2O_5$) also precipitating out, as is shown by X-ray diffraction analysis. The $KH_2PO_4$ crystal is surrounded by polymerized $SiO_2$.

The aqueous films of $K_2O$—$P_2O_5$—$SiO_2$ are normally heated at about 95° C. for about 2–8 hours. This manner of curing treatment produced coatings wherein the crystals were not completely homogeneously dispersed in the residual glassy matrix. The $KH_2PO_4$ crystals, themselves, are water soluble but the enveloping silica-rich glassy matrix inhibits the crystals from dissolving. In FIG. 1, compositions lying along the line DE have been found to be particularly durable. Coatings falling within the composition area CDE are preferred since they are highly silica-rich and contain very little of the soluble $KH_2PO_4$ phase.

This embodiment of the invention is illustrated in the laboratory work outlined in Example I.

EXAMPLE I

Solution A comprised the commercial aqueous potassium silicate solution noted above having a total solids content of about 30% by weight. The proportions of that solids content consisted of about 28% $K_2O$ and 72% $SiO_2$.

Solution B was prepared by dissolving 40 grams of reagent grade $K_2HPO_4$ in 85.6 mls. of distilled $H_2O$. The solution contained about 30% by weight solids consisting of about 67% $K_2O$ and 33% $P_2O_5$.

Solution C was prepared by dissolving 35.6 grams of reagent grade KOH in sufficient distilled $H_2O$ to yield a solution containing 30% by weight KOH.

Solutions A, B, and C were thoroughly blended together in the proper proportions to yield the four liquid paint compositions set out below in weight percent:

|        | 1     | 2     | 3     | 4     |
|--------|-------|-------|-------|-------|
| $K_2O$   | 39.6% | 35.9% | 33.5% | 30.0% |
| $P_2O_5$ | 12.6  | 10.0  | 4.2   | 2.0   |
| $SiO_2$  | 48.0  | 54.3  | 62.2  | 68.0  |

Each paint was applied to a sand blasted steel slide in an amount of about one gram of liquid per square inch of slide surface. The coatings were air dried at room temperature for about one-half hour and thereafter baked at 95° C. for four hours to yield a white film. The degree of opacity developed in each coating was then visually examined with the following results:

Sample 1—fair crystallization; electron micrographs show silica polymerization.

Sample 2—random spots of opaque film; electron micrographs show some large crystals and silica polymerization.

Sample 3—electron micrographs show uniform crystallization with some microcracking.

Sample 4—dense opaque film; electron micrographs show islands of opaque silica globules.

The coated samples were thereafter immersed into water at room temperature for one week. The films prepared from Samples 1 and 2 were somewhat soft and flaky whereas those produced from Samples 3 and 4 were hard, dense, and durable.

As was observed above, more uniformly fine-grained crystallization which is more homogeneously dispersed in the residual glassy network can be achieved through the addition of heavy metal ions to the composition. Useful ions have included those which may form a silicate-coated colloid such as $Cu^{+2}$, $Ni^{+2}$, $Zn^{+2}$, and $Co^{+2}$. The addition of up to about 1% by weight of the heavy metals, calculated as the oxide, has been found effective.

Examples II and III are illustrative of this embodiment of the invention and yield coatings wherein the crystals, themselves, are quite uniformly fine-grained and homogeneously dispersed in the silica matrix. The relatively small size of the crystals gives better assurance that the silica network completely envelopes them giving a highly durable final coating.

EXAMPLE II

Approximately 0.05M solutions were prepared of the nitrates of copper, nickel, zinc, and cobalt. These solutions were then blended into Sample 4 reported above in Example I in the necessary quantities such that the metal, expressed as the oxide, would amount to 0.16, 0.32, 0.48, 0.64, 0.79, 0.95, and 1.11% RO. The resulting mixtures were brushed onto 5 inches × 5 inches sand blasted steel slides such that six grams of solids were deposited in a film about 0.003 inch in depth. The coatings were dried in air at room temperature for 22 hours and thereafter baked at 95° C. for 24 hours to yield white films. After one week's immersion in distilled water at room temperature, the resultant coatings were examined utilizing an electron microscope and were also chemically analyzed. The table below reports the ratio of $SiO_2/K_2O$ in the original Sample 4 and in the baked and water-treated coatings containing the metal nitrate additions.

|             | Copper Additions (% CuO) | | | | | |
|-------------|------|------|------|------|------|------|
|             | None | 0.16 | 0.32 | 0.48 | 0.64 | 0.79 |
| $SiO_2/K_2O$ | 2.5  | 3.5  | 3.6  | 4.85 | 4.2  | 3.7  |
|             | Nickel Additions (% NiO) | | | | | |
|             | None | 0.16 | 0.32 | 0.48 | 0.64 | 0.79 |
| $SiO_2/K_2O$ | 2.5  | 3.3  | 3.9  | 4.7  | 4.7  | 4.4  |
|             | Zinc Additions (% ZnO) | | | | | |
|             | None | 0.16 | 0.32 | 0.48 | 0.64 | 0.79 |
| $SiO_2/K_2O$ | 2.5  | 2.6  | 2.6  | 2.6  | 2.4  | 2.4  |
|             | Cobalt Additions (% CoO) | | | | | |
|             | None | 0.16 | 0.32 | 0.48 | 0.64 | 0.79 |
| $SiO_2/K_2O$ | 2.5  | 2.7  | 2.7  | 2.5  | 2.5  | 2.5  |

It is apparent from that table of chemical analyses that the silica content and, consequently, the durability of the coatings will increase with the addition of the metal, at least up to a certain point. At metal concentrations above about 1% by weight, a precipitate forms which settles out.

Electron micrographs of the coatings demonstrated that those coatings having a metal addition of about 0.48% by weight exhibited a markedly more dense and uniform distribution of silica globules. Therefore, additions of about 0.5% by weight are deemed to be preferred.

EXAMPLE III

Solution D was prepared by dissolving 30 grams $K_2CrO_4$ into 70 grams of distilled water.

Solution E was prepared by dissolving 30 grams of $CrO_3$ into 70 grams of distilled water.

A painting mixture was produced by blending together 50 grams of Solution D, 13 grams of Solution E, and 450 grams of Solution A having a total solids content of 30%, this solids content consisting of 64% $SiO_2$, 32% $K_2O$, and 4% $CrO_3$. Sufficient 0.05M copper nitrate solution was admixed to yield a copper oxide content of about 0.49%.

A coating of the mixture was applied to a sand blasted steel slide to yield about one gram of liquid per square inch of slide surface. After air drying at room temperature for about one-half hour, the coating was baked at 95° C. for 4 hours, yielding a yellow opaque film. Extended immersion in distilled water at room temperature resulted in the yellow color changing to white.

Figure 2:
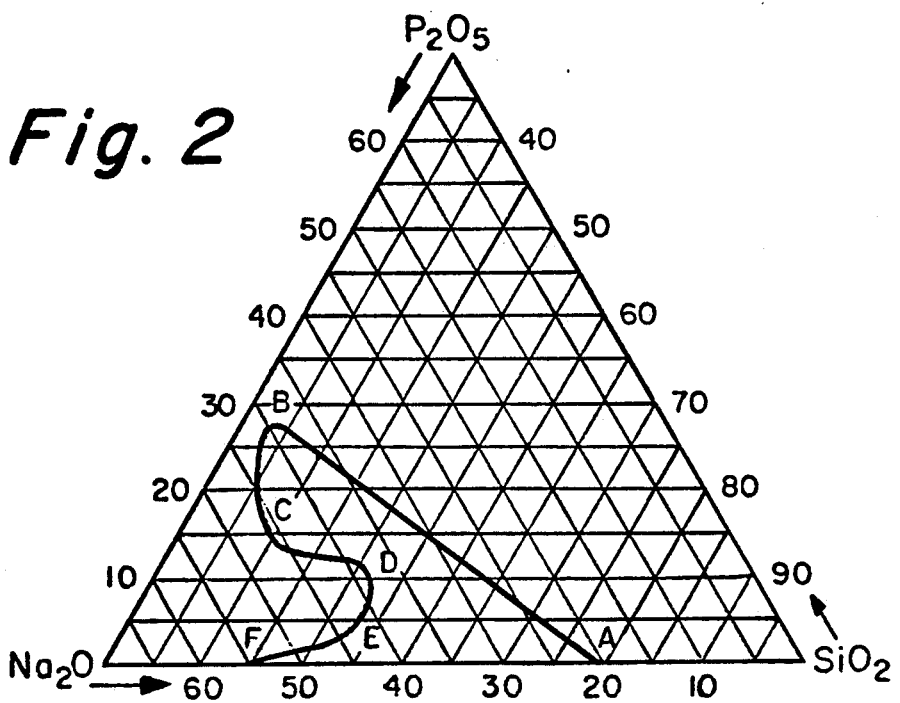

FIG. 2 is a triaxial diagram reflecting compositions in the $Na_2O-P_2O_5-SiO_2$ system reported in weight percent. As was the case with the $K_2O-P_2O_5-SiO_2$ embodiments of this invention, $P_2O_5$ was added to the commercially-available sodium silicate aqueous solution recorded in Table I in varying proportions but such that the quantities of $Na_2O$, $P_2O_5$, and $SiO_2$ were controlled to give a solids content of about 30% by weight of the solutions. Line ABCDEF defines compositions which are in solution and all the products within that field are essentially non-hygroscopic.

The method for applying the coatings and the curing temperatures and times employed are similar to those described previously with respect to the $K_2O-P_2O_5-SiO_2$ compositions. Hence, curing temperatures of about 40°-200° C. for about ¼-8 hours are preferred.

EXAMPLE IV

Solution F was prepared by adding 93.4 grams of the commercial aqueous sodium silicate solution noted above to 6.6 grams of distilled water. The resultant solution contained about 30% by weight solids consisting of about 21% $Na_2O$ and 79% $SiO_2$.

Solution G was prepared by dissolving 40.6 grams of reagent grade $NaH_2PO_4 \cdot H_2O$ in 59.4 grams of distilled water. The solution contained about 30% by weight solids consisting of about 69.5% $P_2O_5$ and 30.5% $Na_2O$.

Solution H was prepared by dissolving 38.7 grams of reagent grade NaOH in 61.3 grams of distilled water, yielding a solution containing about 30% by weight solids of 100% $Na_2O$.

These solutions were utilized in defining FIG. 2. However, none of many blends in varying proportions of these ingredients, when applied to sand blasted steel slides, dried, and baked showed substantial crystallization.

For example, Solution I was prepared by mixing 96.5 grams of Solution F with 3.5 grams of Solution G and 12.6 grams of Solution H to yield a composition consisting of 68% $SiO_2$, 2% $P_2O_5$, and 30% $Na_2O$. It can be observed that the composition is identical to that of Sample 4 reported in Example I except that $Na_2O$ has replaced $K_2O$. Yet, electron microscopy evidenced essentially no crystallization in a coating thereof after air drying and baking.

As is apparent from Example IV, coatings wherein $Na_2O$ alone constitutes the alkali metal oxide will not provide the desired dense, opaque, highly crystalline paints of coatings. Therefore, further laboratory work was conducted to determine what role, if any, $Na_2O$ can play in providing such paints. Example V reports the results of several experiments which point to the fact that, on a weight percent basis, $K_2O$ ought to comprise over about 50% of the composition.

EXAMPLE V

In the following table various mixtures in weight percentages of Solution I and Sample 4 of Example I are recorded. Each mixture was brushed onto a sand blasted steel side, air dried at room temperature for one-half hour, and then baked at 95° C.

| % Solution I | % Sample 4 | Description |
|---|---|---|
| 0 | 100 | Dense, opaque, fully crystallized |
| 10 | 90 | Opaque, fully crystallized |
| 20 | 80 | Opaque, fully crystallized |
| 30 | 70 | Opaque, highly crystallized |
| 40 | 60 | Slightly crystallized |
| 50 | 50 | Very slightly crystallized |
| 60-100 | 40-0 | Essentially no crystallization |

As was explained above, these coatings are normally white and opaque when cured. However, where desired, conventional pigments and fillers may be added to the original solution to produce coatings having a pallette of colors.

We claim:

1. A method for making chemically durable, crystalline, inorganic silicate coatings which consists in the steps of:
   (a) preparing true, non-hygroscopic, aqueous solutions having a pH between about 9-15 containing about 1-12 moles of $SiO_2$/liter from aqueous alkali metal silicate solutions, wherein at least 50% by weight of the alkali metal is present at potassium, and also containing a soluble essentially completely hydrolyzed species of a metal oxide ($M_xO_y$), wherein the ratio Y:X is at least 1.5, in such an amount that the total solids content of the solution is at least 10% by weight;
   (b) applying said solutions to a surface of an article; and
   (c) curing said solutions at a temperature above about 40° C. for a sufficient length of time to cause the crystallization in situ of crystals which cause a reduction in pH of the solution resulting in polymerization of the silica at the crystal interfaces and subsequently throughout the solution.

2. A method according to claim 1 wherein said alkali metal silicates are selected from the group consisting of lithium silicate, sodium silicate, potassium silicate, and mixtures thereof.

3. A method according to claim 1 wherein said metal oxide is selected from the group consisting of $P_2O_5$, $CrO_3$, $WO_3$, and $As_2O_5$.

4. A method according to claim 1 wherein said curing temperatures range between about 40°-200° C.

5. A method according to claim 1 wherein said time sufficient to polymerize the $SiO_2$ ranges about ¼-8 hours.

6. A method according to claim 1 wherein said solutions also contain heavy metal agents up to 1% by weight total of at least one metal ion selected from the group consisting of $Cu^{+2}$, $Ni^{+2}$, $Zn^{+2}$, and $Co^{+2}$.

* * * * *

UNITED STATES PATENT AND TRADEMARK OFFICE
CERTIFICATE OF CORRECTION

PATENT NO. : 4,125,651

DATED : November 14, 1978

INVENTOR(S) : Larry E. Campbell and Stanley D. Stookey

It is certified that error appears in the above-identified patent and that said Letters Patent are hereby corrected as shown below:

Column 4, line 24, "iron" should be -- ion --.

Column 8, line 12, "side," should be -- slide, --.

Signed and Sealed this

Seventeenth Day of July 1979

[SEAL]

Attest:

LUTRELLE F. PARKER

Attesting Officer   Acting Commissioner of Patents and Trademarks